United States Patent [19]
Curry

[11] Patent Number: 6,046,821
[45] Date of Patent: Apr. 4, 2000

[54] UNSHARP MASKING FOR DRAFT MODE RENDERING OF DIGITAL IMAGES

[75] Inventor: Donald J. Curry, Menlo Park, Calif.

[73] Assignee: Xerox Corporation, Stamford, Conn.

[21] Appl. No.: 08/971,628

[22] Filed: Nov. 17, 1997

[51] Int. Cl.[7] .................................................. G06K 9/40
[52] U.S. Cl. ................................. 358/1.9; 382/266
[58] Field of Search .................... 358/532–534, 358/448, 1.9, 1.12; 382/266–269; 395/109, 112

[56] References Cited

U.S. PATENT DOCUMENTS

| | | | |
|---|---|---|---|
| 4,315,318 | 2/1982 | Kato et al. | 364/515 |
| 4,500,919 | 2/1985 | Schreiber | 358/78 |
| 4,536,803 | 8/1985 | Hennig | 358/299 |
| 4,591,904 | 5/1986 | Urabe et al. | 358/75 |
| 4,724,489 | 2/1988 | Oldershaw | 358/284 |
| 4,908,876 | 3/1990 | DeForest et al. | 382/54 |
| 5,283,671 | 2/1994 | Stewart et al. | 358/532 |
| 5,682,443 | 10/1997 | Gouch et al. | 382/254 |
| 5,751,433 | 5/1998 | Narendranath et al. | 358/298 |
| 5,751,434 | 5/1998 | Narendranath et al. | 358/298 |

OTHER PUBLICATIONS

Curry, D.J. Copending U.S. Application No. 08/971,767 entitled "Dynamically Adjustable Unsharp Masking For Digital Image Processing".

Russ, J.C. "The Image Processing Handbook", CRC Press, Raleigh, North Carolina, pp. 25, 130–131, 156–157.

*Primary Examiner*—Thomas D. Lee
*Assistant Examiner*—Stephen Brinich

[57] ABSTRACT

An engine renders digitally represented images in a reduced marking material mode and in other modes. A digitally represented unsharp mask of an image is produced and combined with the image. When in the reduced marking material mode, the unsharp mask is given a relatively high weight, such as 2.0 or higher. When in another mode, such as a normal printing mode, the unsharp mask is given substantially less weight, such as about 1.0.

10 Claims, 2 Drawing Sheets

FIG. 2
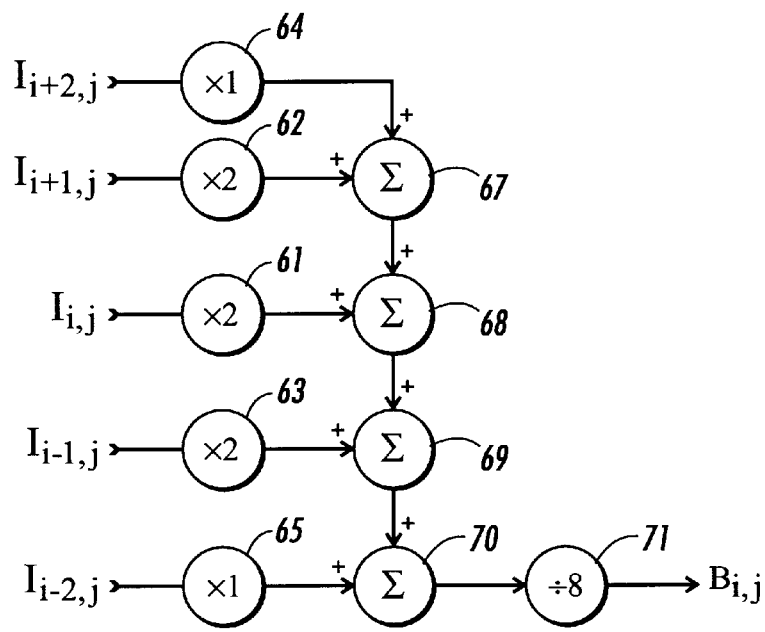
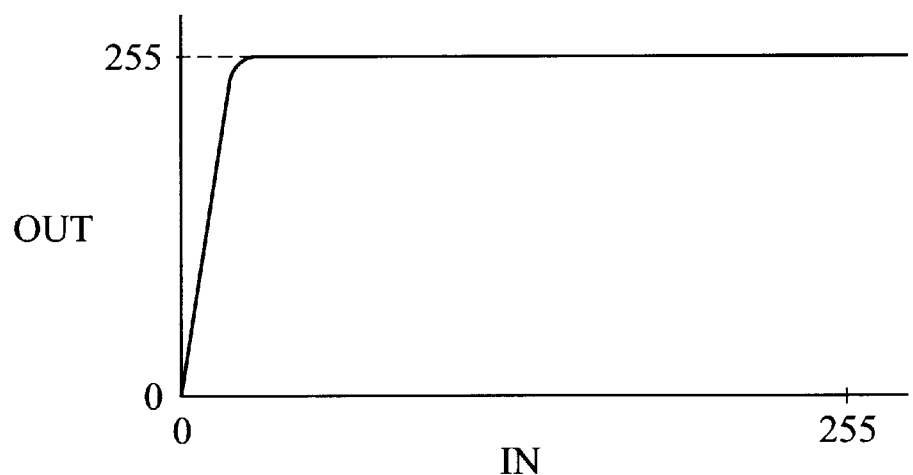
FIG. 3

UNSHARP MASKING FOR DRAFT MODE RENDERING OF DIGITAL IMAGES

CROSS REFERENCE TO RELATED APPLICATION

This application is related to a concurrently filed, commonly assigned U.S. patent application of Donald J. Curry, application Ser. No. 08/971,767 on "Dynamically Adjustable Unsharp Masking for Digital Image Processing."

FIELD OF THE INVENTION

The invention relates to digital image processing, including the rendering of digital images.

BACKGROUND AND SUMMARY OF THE INVENTION

Unsharp masking is used in photography for highlighting edges of images. To this end, a blurred version of an image is subtracted from the original image to produce an unsharp image model. This mask is then superimposed on the original image to increase the contrast of any abrupt contrast transitions (i.e., edges) within the image. This process can be described by a linear equation:

$$I_{out} = I_{in} + C(I_{in} - I_{mask})$$

where $I_{in}$ = the original image $I_{mask}$ = the blurred image

C = a sharpening control variable $I_{out}$ = the edge sharpened image

Digital images are composed of discrete tones (e.g., often only black and white pixels), so the perceived quality of these images strongly depends on the human visual response to the printed pixel patterns that define the images. Thus, continuous tone images are most effectively represented by pixel patterns, such as halftoned pixel patterns which are optimized to create the appearance of smooth, well controlled contrast variations, while line art images, such as text, are better represented by pixel patterns which are optimized to create the appearance of sharp, crisp contrast variations. Therefore, it would be beneficial to be able to dynamically tune a digital unsharp image mask to the type of digital image that is being printed so that edge highlighting of the unsharp mask can be realized without detracting from the perceived quality of digitally printed image as a whole.

Sometimes perceived image quality is secondary to the goal of printing the fundamental information contrast of the image at the lowest possible cost. Some printers have a "draft" printing mode for this purpose. The fundamental information contrast of many images is represented by the edges of the compositional elements of these images. Consequently, it would be beneficial to have a technique for generating effectively "differentiated" versions of digital images so that marking material (e.g., toner or ink) can be saved when printing these images in a "draft" mode.

BRIEF DESCRIPTION OF THE DRAWINGS

Other objects and advantages of this invention will become apparent when the following detailed description is read in conjunction with the attached drawings, in which FIGS. 2–3 are a block diagram of a representative stage of a separable filter of the type that can be used to reduce the computational complexity of carrying out this invention.

DETAILED DESCRIPTION OF THE INVENTION

Figure 1:
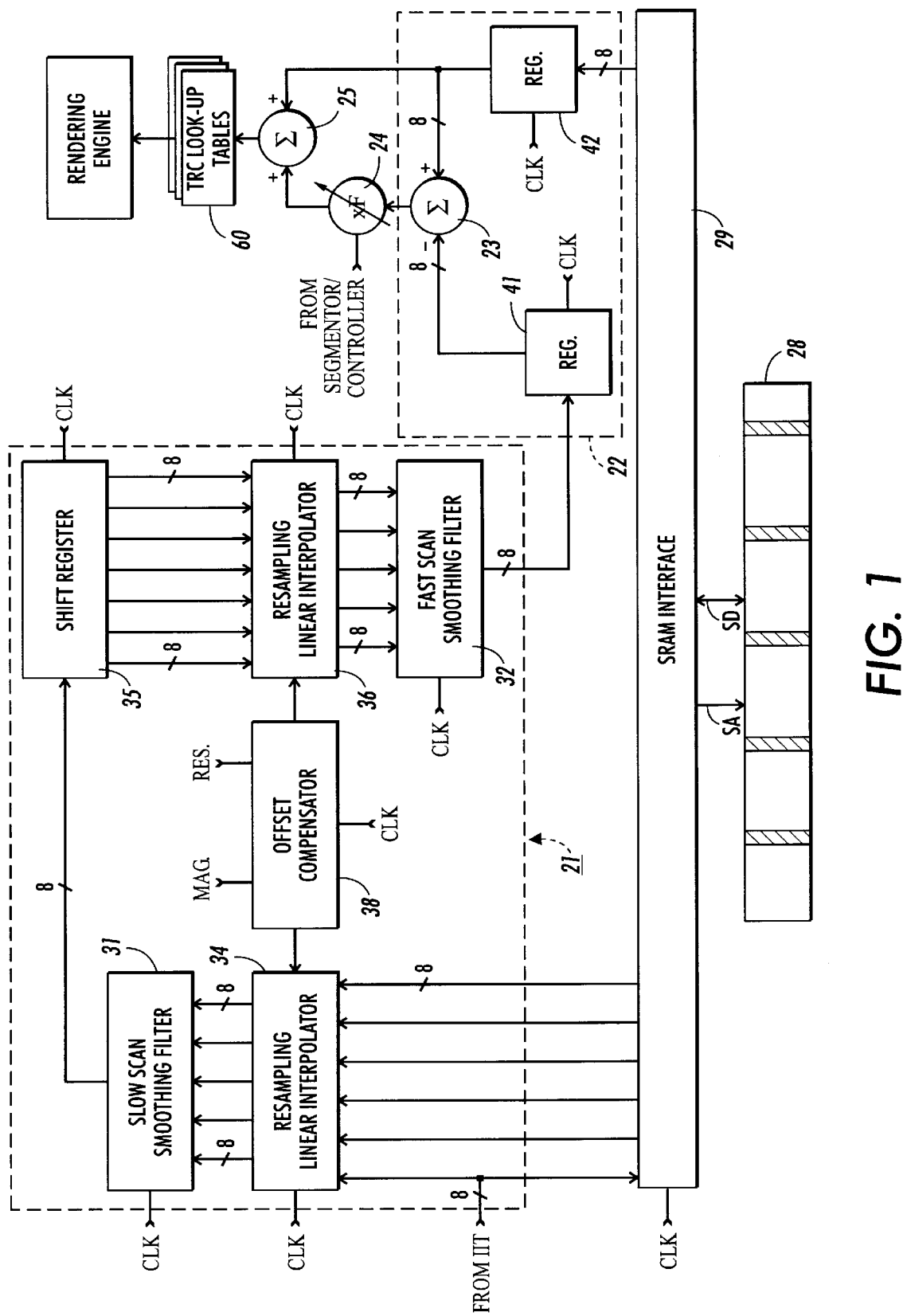
FIG. 1 is a block diagram of a digital image processing system with tunable unsharp masking in accordance with this invention.

While the invention is described in some detail herein with reference to a specific embodiment, it is to be understood that there is no intent to limit it to that embodiment. On the contrary, the intent is to cover all modifications, alternatives and equivalents falling within the spirit and scope of the invention as defined by the appended claims.

Turning now to the drawings, and at this point especially to FIG. 1, an original image is represented at a suitable resolution, such as 300 dots per inch (d.p.i.) by pixel values (typically 8-bit values) which are serially received in raster scan order (say, left-to-right/top-to-bottom order) from a suitable image input terminal (IIT). As a general rule, the IIT is a scanner subsystem.

To carry out the unsharp masking of the digital images that is contemplated by this invention, there is an image resampling, contextually sensitive smoothing filter 21 for feeding a blurred version of the original image to a low pass filter 22 at the desired output resolution and magnification. The low pass filter 22 effectively "differentiates" (i.e., edge enhances) this blurred image by essentially passing black and near black pixel values (i.e., pixels having near 0 values) while transforming all other pixel values toward white (e.g., toward a value of 255). See FIG. 2.

A summer 23 computes the difference between the original image and the edge enhanced version of the image to provide an unsharp mask of the original image. A variable multiplier 24 then weights this unsharp mask in accordance with an adjustable weighting factor F. Finally, a summer 25 then additively combines this weighted unsharp mask with the original image for rendering of the unsharp masked image at the selected magnification and resolution by a suitable rendering engine 26.

As illustrated, an SRAM memory 28 functions as a randomly addressable FIFO ring buffer for sharing the pixel values which are needed to compute the blurred and unsharp masked versions of the original image. It has been found that only about five scan lines of context are required to satisfactorily compute the blurred image, so the SRAM 28 is sized accordingly. Data is transferred back and forth between the SRAM 28 and an SRAM interface 29 via a data path SD, and the locations within which these data reads and writes are performed are determined by the addresses carried on an address path SA.

To reduce the computational complexity, the smoothing filter 21 is a so-called separable filter having two sections, 31 and 32, one for contextually smoothing the image in the slowscan direction (i.e., the process direction) and the other for contextually smoothing the image in the orthogonal or fast scan direction. Thus, as shown, the original input image first is resampled by a linear interpolator 34 and then is smoothed in the slow scan direction by the first section 31 of the filter 21. This provides an intermediate representation of the image, so sufficient context of this intermediate representation to carry out the smoothing of the image in the fast scan direction is stored in a shift register 35 which has an output post from each of its stages. Thus, the fast scan context that is accumulated by the shift register 35 is resampled by another linear interpolator 36 and then smoothed in the fast scan direction by the second stage 32 of the smoothing filter 32.

As will be appreciated, the original image is effectively stepped across the smoothing filter 21 in context and at a desired magnification and resolution. The magnification may cause the image to step across the smoothing filter 21 in steps that are not integer multiples of the original scan pitch, so an offset compensator 38 is provided for causing the resampling linear interpolators 34 and 36 to substantially compensate for any displacement of the pixel center positions in the magnified image from the center positions of the corresponding pixels in the original image. One additional line of context usually is sufficient to enable the interpolator 34 to perform this compensation in the slow scan direction. In the slow scan direction, however, the interpolator 36 may not only have to compensate for magnification caused pixel center offsets, but may also have to compensate for resolution mismatches (such as when an image that is scanned at 300 d.p.i., is rendered at 600 d.p.i.).

An image processing pipeline is employed to carry out this invention, so that data is synchronously transferred from step-to-step of the process. The registers 41 and 42 through which the blurred and the original image are respectively shifted for computing the unsharp mask and the unsharp masked output image are part of this pipeline.

In accordance with the present invention, the weighting factor F for the unsharp mask is adjustable by varying the multiplication of the multiplier 24. This weighting may be dynamically adjusted on, say, a pixel-by-pixel basis in response to, say, a logical image type characterizing signal supplied by an image segmentor (not shown). Alternatively, the weighting factor F of the multiplier 24 may be controlled in response to the manual manipulation of a mode switch (also not shown). Or, the dynamic and manual control of the weighting factor F may be combined. The unsharp mask tends to soften or sharpen the rendered image depending on whether the weighting factor F is less than or greater than 1. Thus, for example, the weighting factor F may be selected to be about (a) 0.8 for the printing of continuous tone images to cause the unsharp mask to soften the edge detail, (b) 1.2 for the printing of line art images to cause the unsharp mask to enhance the image edges, or (c) 2.0 or higher for draft mode printing to cause the unsharp mask to strongly dominate the rendering in the interest of saving marking material. If the weighting factor F is only manually controllable, it may be set to a value of about 1.0 for a normal print mode and to a value of about 2.0 for a draft or toner/ink saver mode.

What is claimed is:

1. A process for selectively operating an engine that renders digitally represented images in a reduced marking material mode and at least one other mode, said method comprising the steps of:

producing a digitally represented unsharp mask of such an image; and combining said unsharp mask with said image with a relatively high weight being given to said unsharp mask for operating said engine on said reduced marking material mode and substantially less weight being given to said unsharp mask for operating said engine in said other mode.

2. The method of claim 1 in which the relatively high weight is 2.0 or higher.

3. The method of claim 1 in which the step of producing the digitally represented unsharp mask comprises:

smoothing the image in a slow scan direction to obtain an intermediate representation;

smoothing the intermediate representation in a fast scan direction to obtain a blurred version; and obtaining the digitally represented unsharp mask by taking the difference between the blurred version and the image.

4. The method of claim 1 in which the step of combining said unsharp mask with said image comprises:

multiplying the unsharp mask by a weighting factor to obtain a weighted version of the unsharp mask; and additively combining the weighted unsharp mask with the original digital image.

5. The method of claim 1 in which said other mode is a normal print mode in which the weight given to the unsharp mask is about 1.0.

6. A machine selectively operable to render digitally represented images in a reduced marking material mode and at least one other mode, the machine comprising:

mask producing circuitry for producing a digitally represented unsharp mask of such an image;

combining circuitry for combining said unsharp mask with said image with a relatively high weight being given to said unsharp mask for operating said machine in said reduced marking material mode and substantially less weight being given to said unsharp mask for operating said machine in said other mode.

7. The machine of claim 6 in which the mask producing circuitry comprises:

slow scan smoothing circuitry for smoothing said image in a slow scan direction to obtain an intermediate representation;

fast scan smoothing circuitry for smoothing the intermediate representation in a fast scan direction to obtain the blurred version of said image; and difference circuitry for using the blurred version and said image to obtain said unsharp mask.

8. The machine of claim 6 in which the combining circuitry comprises:

weighting circuitry for weighting said unsharp mask in accordance with an adjustable weighting factor; and summing circuitry for additively combining the weighted unsharp mask and said image.

9. The machine of claim 8 in which the weighting circuitry comprises:

dynamic control circuitry for dynamically adjusting the weighting factor on a pixel-by-pixel basis.

10. The machine of claim 8 in which the weighting circuitry comprises:

manual control circuitry for adjusting the weighting factor in response to manual manipulations.

* * * * *